Patented Mar. 21, 1939

2,150,968

UNITED STATES PATENT OFFICE 2,150,968

PRODUCTION OF CONVERSION PRODUCTS FROM CELLULOSE OR CELLULOSIC MATERIALS

Fritz Guenther, Ludwigshafen-on-the-Rhine, Hans Haussmann, Mannheim, and Wolfgang Alt, Ludwigshafen-on-the-Rhine, Germany, assignors to I. G. Farbenindustrie Aktiengesellschaft, Frankfort-on-the-Main, Germany No Drawing. Application March 18, 1936, Serial No. 69,526. In Germany March 22, 1935

11 Claims. (Cl. 260—214)

This invention relates to a process for the production of conversion products from cellulose or cellulosic materials by causing to react the said materials with derivatives of isatoic anhydride.

A process for the manufacture and production of derivatives of cellulose and the like is described in the U. S. specification No. 1,567,731 according to which the cellulose or the like is combined with isatoic anhydride or its derivatives or with substances which contain the atomic complex characteristic of isatoic anhydride, and if desired subsequently diazotized and coupled with coupling components.

We have now found that especially valuable conversion products of the said kind can be obtained from cellulose and cellulosic materials by causing derivatives of isatoic anhydride which are substituted in the nucleus or on the nitrogen atom or in both places by alkyl, cycloalkyl or aralkyl groups of high molecular weight to act on the said initial materials, the reaction products being if desired subsequently diazotized, so far as they contain primary amino groups in the molecule and coupled with coupling components. Aliphatic radicles which may be attached to the isatoic acid anhydride are particularly those which are derived from fatty acids of vegetal origin for example the dodecyl-, octodecyl, oleyl or the stearoyl radicle and the like; as mixed aliphatic aromatic radicles there may be mentioned the benzyl-, ethylphenyl or stearyl-phenyl radicle; furthermore polynuclear radicles such as the acyl radicle of abietic acid or the corresponding hydrocarbon may also be used as substituents. In many cases it is also advantageous to react the reaction products, even those which contain no primary amino groups, with diazo compounds of any desired amines to form coloured compounds.

The process may also be carried out from the start with derivatives of isatoic anhydride which contain azo radicles.

It is also possible to obtain reaction products of the said kind by causing cellulose or cellulosic material to react with isatoic anhydride or any derivative thereof, even those which contain no alkyl or aralkyl groups of high molecular weight or radicles containing the same, and then subsequently to introduce into the molecule of the reaction products alkyl or aralkyl groups of high molecular weight or radicles containing the same. This may be effected for example by causing the reaction products, especially those containing hydroxy or amino groups, to be alkylated, aralkylated, acylated or condensed while employing components which contain alkyl or aralkyl radicles of high molecular weight, as for example dodecyl bromide, stearic acid, oleic acid chloride or oleic anhydride, or to be reacted with diazo compounds containing the said radicles of high molecular weight. When the reaction products contain primary amino groups, the procedure may be that they are diazotized and then coupled with components containing alkyl or aralkyl radicles of high molecular weight. The cellulose or the cellulose component of the cellulosic material may be converted into the said reaction products throughout the whole mass or only on the surface.

In the said manner there are obtained colored or uncolored conversion products of cellulose or cellulosic material which are distinguished by a pleasant, frequently wool-like, touch as well as by water-repelling properties combined with high fastness to washing. Even the reaction products which contain no azo radicles are of considerable industrial importance by reason of their pleasant touch and their capacity for repelling water and also by reason of the capacity for being dyed by acid dyestuffs.

With regard to the course of the reaction it may be mentioned for example that by the reaction of the said derivatives of isatoic anhydride on the cellulose or cellulosic material, one molecule of carbon dioxide per molecule of the isatoic anhydride is split off according to the following equation:

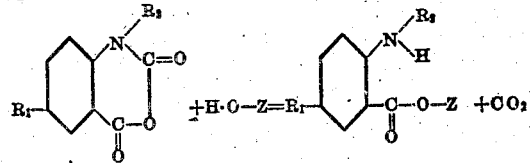

in which H.O—Z is cellulose.

$R_1$ and $R_2$ are radicles, at least one of which stands for an alkyl, cycloalkyl or aralkyl group of high molecular weight or a radicle containing such group and the other of which may be hydrogen.

The process is suitable for example for the treatment of loose or spun, or fabrics of, cotton, viscose artificial silk, copper oxide-ammonia artificial silk, hemp, paper, straw or wood for the production of effects which are resistant to a high degree to the action of water and washing agents. It has been found to be advantageous to add small amounts of basic substances to the cellulose or cellulosic material before or during the reaction with isatoic anhydride or its derivatives.

The following examples will further illustrate the nature of this invention but the invention is not restricted to these examples. The parts are by weight.

Example 1

10 parts of cotton fabric are treated for 15 minutes in a bath of 100 parts of alcohol containing 4 parts of 0.1 normal caustic soda solution. After drying the fabric is kept moving for 5 minutes in a solution of 2 parts of N-octodecyl-isatoic anhydride in 100 parts of carbon tetrachloride. The fabric is then taken out, dried and heated for two hours at 100° C. By this treatment the cotton fabric acquires a pleasant touch; when treated with water its properties do not change nor is it wetted.

Example 2

10 parts of cotton fabric are treated for 5 minutes in a solution of 2 parts of N-octodecyl-isatoic anhydride in 100 parts of carbon tetrachloride to which has been added a little sodium ethylate. The fabric is then rapidly dried in a cold current of air and then heated for an hour at 110° C.

The cotton fabric treated in the said manner is then kept moving for a long time in an acid bath containing the diazo compound of para-nitraniline. Sufficient wetting of the fabric is ensured by adding the sodium salt of isopropylated naphthalene sulphonic acid. The fabric is then rinsed thoroughly in hot water and dried. The fabric thus treated has a pleasant touch, a brilliant orange coloration fast to washing and is only wetted with water with difficulty.

We claim:

1. The process for the production of conversion products from cellulosic substances which comprises causing to react the said substances with such a derivative of the isatoic anhydride as contains at least one radicle selected from the class consisting of aliphatic, cycloaliphatic and mixed aliphatic-aromatic radicles containing a least 7 carbon atoms.

2. The process for the production of conversion products from cellulosic substances which comprises causing to react the said substances with such a derivative of the isatoic anhydride as contains one radicle selected from the class consisting of aliphatic, cycloaliphatic and mixed aliphatic-aromatic radicles containing at least 7 carbon atoms attached to the benzene nucleus.

3. The process for the production of conversion products from cellulosic substances which comprises causing to react the said substances with a derivative of the isatoic anhydride containing one radicle selected from the class consisting of aliphatic, cycloaliphatic and mixed aliphatic-aromatic radicles containing at least 7 carbon atoms attached to the nitrogen atom.

4. The process for the production of conversion products from cellulosic substances which comprises causing to react the said substances with a derivative of the isatoic anhydride containing at least one aliphatic radicle corresponding to the high molecular fatty acids of vegetal origin.

5. The process for the production of conversion products from cellulosic substances which comprises causing to react the said substances with a derivative of the isatoic anhydride containing at least one aliphatic radicle corresponding to the acids contained in hardened train oils.

6. The process for the production of conversion products from cellulosic substances which comprises causing to react the said substances with a derivative of the isatoic anhydride containing at least one octodecyl radicle.

7. The process for the production of conversion products from cellulosic substances which comprises causing to react the said substances with an isatoic anhydride containing at least one group capable of substitution and subsequently introducing into the condensation product one radicle selected from the class consisting of aliphatic, cycloaliphatic and mixed aliphatic-aromatic radicles containing at least 7 carbon atoms.

8. The process for the production of conversion products from cellulosic substances which comprises causing to react the said substances with a derivative of the isatoic anhydride containing one radicle selected from the class consisting of aliphatic, cycloaliphatic and mixed aliphatic-aromatic radicles containing at least 7 carbon atoms attached to the benzene nucleus and subsequently diazotizing the condensation product and coupling with coupling components.

9. The process for the production of conversion products from cellulosic substances which comprises causing to react the said substances with a derivative of the isatoic anhydride containing one radicle selected from the class consisting of aliphatic, cycloaliphatic and mixed aliphatic-aromatic radicles containing at least 7 carbon atoms attached to the benzene nucleus and containing at least one azo radicle and coupling the condensation products with coupling components.

10. Cellulosic material esterified with an isatoic acid containing at least one radicle selected from the class consisting of aliphatic, cycloaliphatic and mixed aliphatic-aromatic radicles containing at least 7 carbon atoms.

11. Cellulosic material esterified with an isatoic acid containing at least one radicle selected from the class consisting of aliphatic, cycloaliphatic and a mixed aliphatic-aromatic radicles containing at least 7 carbon atoms the isatoic residue being attached to an aromatic radicle by means of a diazo linkage.

FRITZ GUENTHER.
HANS HAUSSMANN.
WOLFGANG ALT.